(12) United States Patent
Shaw et al.

(10) Patent No.: US 8,600,404 B2
(45) Date of Patent: *Dec. 3, 2013

(54) DELIVERY OF NETWORK SERVICES

(75) Inventors: Venson M Shaw, Kirkland, WA (US);
Ileana A Leuca, Bellevue, WA (US);
David W. Holmes, Sammamish, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/591,163

(22) Filed: Aug. 21, 2012

(65) Prior Publication Data

US 2012/0315883 A1 Dec. 13, 2012

Related U.S. Application Data

(63) Continuation of application No. 10/336,229, filed on Jan. 2, 2003, now Pat. No. 8,249,615.

(60) Provisional application No. 60/421,519, filed on Oct. 25, 2002.

(51) Int. Cl.
*H04W 24/04* (2009.01)
*H04L 12/28* (2006.01)
*H04M 3/42* (2006.01)

(52) U.S. Cl.
USPC ............. 455/456.1; 455/414.1; 455/414.3; 370/252; 705/7.22; 705/37

(58) Field of Classification Search
USPC ............. 455/432.1–432.3, 433, 456.1–457, 455/414.1–414.4; 370/252, 310, 352; 705/1.1, 37, 7.11–7.22
See application file for complete search history.

(56) References Cited

U.S. PATENT DOCUMENTS

| | | | | |
|---|---|---|---|---|
| 6,047,261 A | * | 4/2000 | Siefert | 705/7.38 |
| 6,636,733 B1 | * | 10/2003 | Helferich | 455/412.2 |
| 6,813,501 B2 | * | 11/2004 | Kinnunen et al. | 455/456.2 |
| 6,947,390 B2 | * | 9/2005 | Hundscheidt et al. | 370/252 |
| 8,249,615 B2 | * | 8/2012 | Shaw et al. | 455/456.1 |
| 2003/0050062 A1 | * | 3/2003 | Chen et al. | 455/435 |
| 2004/0043770 A1 | * | 3/2004 | Amit et al. | 455/450 |
| 2006/0080707 A1 | * | 4/2006 | Laksono | 725/38 |

* cited by examiner

*Primary Examiner* — Matthew Sams
(74) *Attorney, Agent, or Firm* — Hartman & Citrin LLC (57) ABSTRACT

A network includes user information comprising terminal capabilities and readiness information for a terminal device. A network element receives the terminal capabilities and readiness information from the terminal device and communicates the terminal capabilities and readiness information such that it is received and stored. The information is accessed to set media delivery parameters for the terminal device.

17 Claims, 11 Drawing Sheets

DELIVERY OF NETWORK SERVICES

This application is a continuation of U.S. patent application Ser. No. 10/336,229, filed Jan. 2, 2003, now U.S. Pat. No. 8,249,615; which claims priority to U.S. Provisional Patent Application Ser. No. 60/421,519, filed Oct. 25, 2002; the contents of which are hereby incorporated by reference herein in their entirety into this disclosure.

FIELD

The invention relates to communications, and, more particularly, to communication via a network.

BACKGROUND

Wireless telephones are popular, ubiquitous devices. It is now possible to make and receive phone calls from almost any place in the world. Communication is even possible from remote and undeveloped areas using wireless satellite telephones. Herein, the term wireless telephone refers to any device capable of transmitting and receiving voice and/or data (non-voice) information to and from a network without the use of wires, cables, or other tangible transmission media. So-called cellular telephones are a common example of wireless phones.

Wireless telephones and the networks by which they communicate operate according to various technologies, including analog mobile phone service (AMPS), circuit switching, packet switching, wireless local area network (LAN) protocols, code division multiple access (CDMA), time division multiple access (TDMA), frequency-division multiplexing (FDM), spread-spectrum, global system for mobile communications (GSM), high-speed circuit-switched data (HCSD), general packet radio system (GPRS), enhanced data GSM environment (EDGE), and universal mobile telecommunications service (UMTS). Of course, these are only examples, and other technologies may be employed in wireless communication as well.

Herein, the term "wireless device" is meant to include wireless telephones (including cellular, mobile, and satellite telephones), and also to include a variety of other wireless devices, including wireless web-access telephones, automobile, laptop, and desktop computers that communicate wirelessly, and wireless personal digital assistants (PDAs). In general, the term 'wireless device' refers to any device with wireless communication capabilities.

Many companies produce wireless telephones and other wireless devices. Among the more well-known producers are Nokia®, Ericsson®, Motorola®, Panasonic®, Palm® Computer, and Handspring®. A variety of producers also provide wireless devices comprising versions of the Microsoft® Windows® operating software.

Third generation (3G) wireless devices provide high-bandwidth wireless access to communication networks. With such devices it may be possible to provide services to wireless devices such as streaming video, multimedia messaging, and so forth. Users of the network may, at different times, employ different devices to access the network. The quality and availability of services may vary according to the capabilities of the device employed for access, the access device's present operating environment, and other dynamic parameters.

SUMMARY

In one embodiment, user information comprising terminal capabilities and readiness information is stored and accessed to set media delivery parameters. In another embodiment, a terminal device stores terminal capabilities, maintains readiness information, communicates the terminal capabilities to the network, and communicates the readiness information to the network when the readiness information changes. In another embodiment, terminal capabilities for a terminal of a network user are received and stored by a network. A service request is received from the user, and the terminal capabilities are read and compared with service provider service requirements to select a service provider to meet the service request.

In another embodiment, a device includes a wireless communication interface, terminal capabilities, readiness information, and logic to maintain the readiness information and to communicate the terminal capabilities and readiness information via the wireless communication interface.

In another embodiment, a network includes a network element comprising user information including terminal capabilities and readiness information for a user of the network. A network element receives the terminal capabilities and readiness information from a terminal device and communicates the terminal capabilities and readiness information such that it is received and stored by the network element comprising the user information.

In another embodiment, a network includes a network element to store user information comprising terminal device capabilities and readiness information. The network also includes a network element to access the user information and to set media delivery parameters accordingly.

FIGURES

The invention may be better understood with reference to the following figures in light of the accompanying description. The present invention, however, is limited only by the scope of the claims at the concluding portion of the specification.

DESCRIPTION

In the following description, references to "one embodiment" or "an embodiment" do not necessarily refer to the same embodiment, although they may. In the figures, like numbers refer to like elements.

Herein, "logic" refers to any information having the form of instruction signals and/or data that may be applied to affect the operation of a processing device. Examples of processing devices are computer processors (processing units), microprocessors, digital signal processors, controllers and microcontrollers, and so on. Logic may be formed from signals stored in a device memory. Software is one example of such logic. Examples of device memories that may comprise logic include RAM (random access memory), flash memories, ROMS (read-only memories), EPROMS (erasable programmable read-only memories), and EEPROMS. Logic may also be comprised by digital and/or analog hardware circuits, for example, hardware circuits comprising logical AND, OR, XOR, NAND, NOR, and other logical operations. Logic may be formed from combinations of software and hardware.

Figure 1:
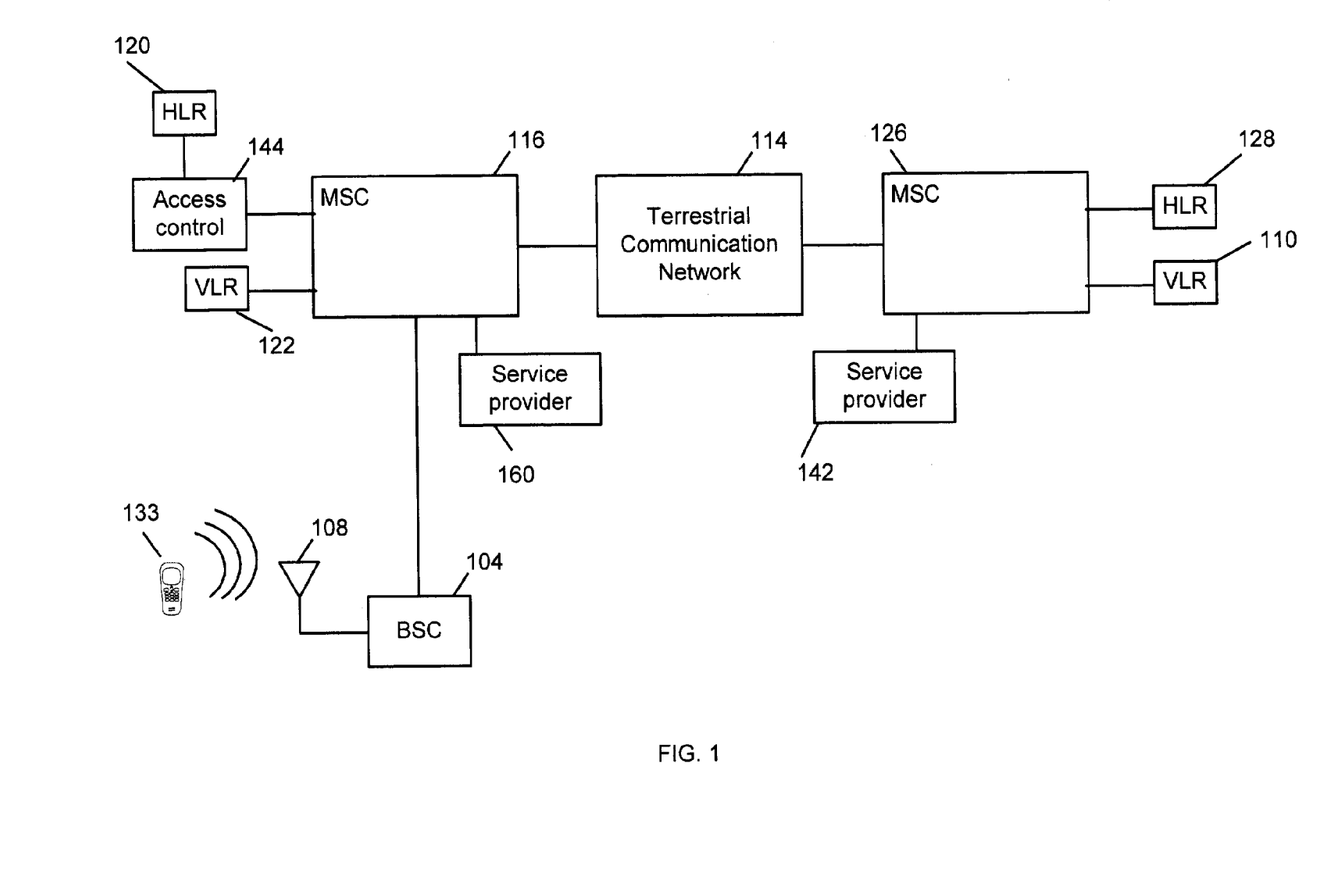
FIG. 1 is a block diagram of an embodiment of a communication network environment.

FIG. 1 is a block diagram of an embodiment of a wireless network environment. A base station controller (BSC) 104 network element is coupled to an antennae 108 to receive signals from a wireless device 133. The BSC 104 is coupled to a mobile switching center (MSC) 116 network element that is responsible, among other things, for routing calls and communications to their appropriate destination. Herein, the term "network element" refers to any one or more devices of a communication network, e.g. devices that participate at least occasionally in the operation of the network. Other components included in a typical MSC 116, such as a processor, memory, and various input/output devices, have been omitted for clarity of discussion. The MSC 116 is coupled to a terrestrial (non-wireless) communication network 114 to enable, among other things, communication with wired devices such as home and business telephones. The MSC 116 is coupled by way of the terrestrial communication network 114 to a second wireless communication network comprising MSC 126.

A service provider 160 is coupled to MSC 116 to provide services such as streaming video, multimedia messaging (for example, to help enable the Multimedia Messaging Service, or MMS, which provides for the communication of video and other advanced multimedia formats), and so on. A similar service provider 142 is coupled to MSC 126. A service provider is any device or combination of devices that provides information to terminal devices (wireless telephones, etc.) or to other service providers via the network environment. A Home Location Registry (HLR) 120 stores records (collections of data) for users and/or terminal devices that have subscribed for access to the network comprising MSC 116. Each record may be referred to herein as user information. A second HLR 128 performs a similar function for the network comprising MSC 126. Herein, "terminal device" refers to any device employed by a user (typically a person but also possibly an autonomous or semi-autonomous device system) to access the network environment. When a device is roaming on the network (e.g. the user of the device is subscribed to a network other than the one comprising MSC 116), such user information may be stored in a Visitor Location Registry (VLR) 122. The network comprising MSC 126 also comprises a VLR 110.

In another embodiment, the user information may be stored by a network element such as a Home Subscriber Server (HSS) that is shared by one or more networks of the network environment.

An access control network element 144 controls access to the user information stored by the HLR 120. The access control 144 ensures that only those network elements of the network environment which are authorized to access the user information may do so. In one embodiment access control is provided according to an id/password scheme. The access control 144 is shown as a stand-alone network element for clarity of explanation. In practice, it may be a stand-alone device or functionally incorporated into one or more other network elements, such as the HLR 120.

Figure 2:
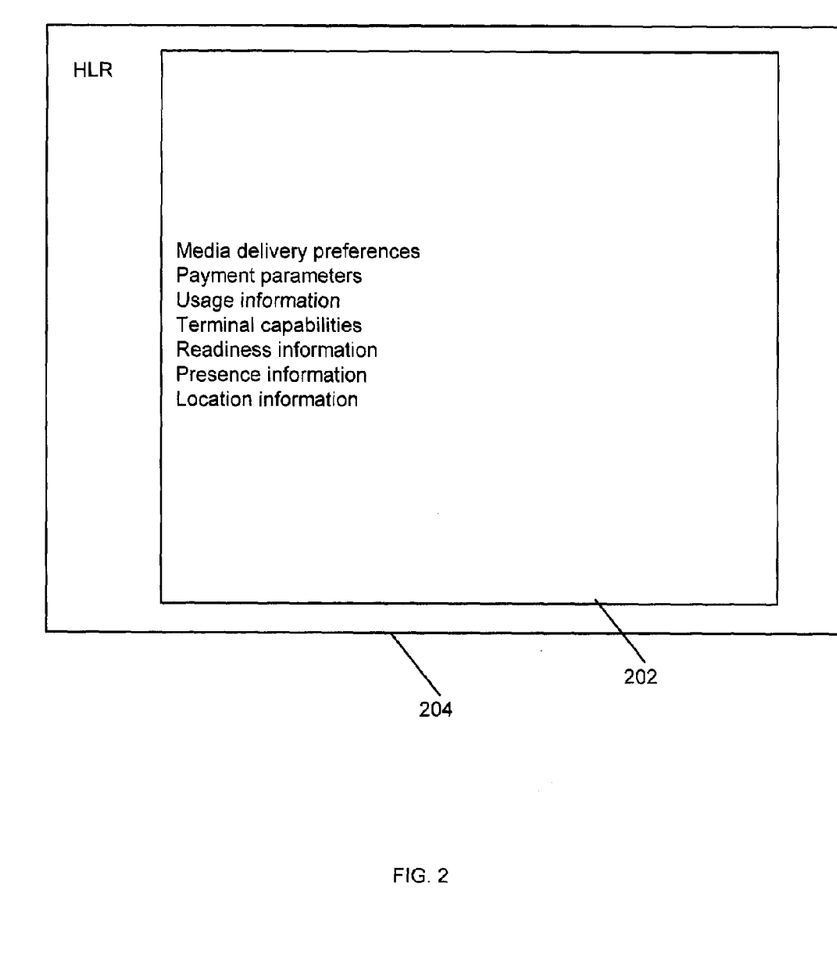
FIG. 2 is a block diagram illustrating an embodiment of user information stored in a Home Location Registry.

FIG. 2 is a block diagram illustrating an embodiment of user information 202 stored in a Home Location Registry 204. In various embodiments, the user information 202 may be associated with an individual user, a terminal device, or a group of more than one users or more than one terminal devices. The user information 202 comprises media delivery preferences (also called user preferences), payment parameters, usage information, terminal capabilities, readiness information, presence information, and location information for one or more users and/or terminal devices. Media delivery (user) preferences include information about the manner in which information should be delivered to the user and/or terminal device. Payment parameters include information about how much the user is willing to pay to have information delivered, and possibly how payment will be provided. Usage information comprises information about the user's access to the network environment, possibly including how, when, how often, and for what purpose the user accessed the network environment. Usage information may include information about which services a user accesses and/or how often, and/or the most recently used and/or most frequently accessed services. In one embodiment, this information or portions thereof is collected by the MSC 116 associated with the HLR 204. Where an HSS or other central storage location is employed by multiple networks, multiple MSCs may contribute to collection and storage of the usage information for terminals and/or users, and access control may be provided according to which MSC collected the information, and/or which MSC is comprised by a home network for the user and/or terminal.

Terminal capabilities comprises information about the terminal device's capabilities to receive, process, and display information. Readiness information comprises information about the terminal device's readiness to receive information from the network, for example, if the device is ready, not ready, sleeping, on standby, and so on. Presence information comprises information about whether or not the user of the terminal device is currently present to operate and/or receive information via the terminal device. The readiness information and the presence information together may establish whether the terminal equipment is ready to receive, process, and display information, and whether the user of the terminal device is present to operate and/or receive information via the terminal.

Location information comprises information about the location of the device. Such information may be useful in determining the type of information to deliver, the quality and quantity of information to deliver, and so on. Location information may be 'literal', e.g. a geographic address or location, or 'logical', e.g. "In a Meeting", "In Transit", and so on.

The user information 202 may be employed by service providers and/or the network environment to determine the appropriate frame rate, frame size, compression ratio, quality of service, and so on for information delivery to terminal devices. As previously noted, a service provider is any device or combination of devices that provides information to a terminal device via the network environment. For example, service providers may provide streaming video, news feeds, stock quotes, multimedia messaging, and so on to terminal devices.

The user information 202, such as the terminal capabilities, presence information, location information, and readiness information, may be updated dynamically as circumstances change. For example, if the user changes terminals after coming home from work, new terminal capabilities, readiness information, presence information, and location information for the user may be provided from the terminal to the network and stored in the user information of the HLR 204. Terminal devices, service providers, network elements, and network operators are just some of the sources from which updates to the user information 202 may be derived.

Wireless devices may roam from one network to another. The network to which the wireless device is subscribed for access is referred to herein as the device's home network. Networks other than the home network that the device may access are referred to herein as roaming networks. In one embodiment, a terminal device attempts to access a service of a roaming network. A request to access the user information associated with the device is communicated from the roaming network to the home network. The access control 144 of the home network determines if the requesting network, service provider, or network element is authorized to access the user information for the device. For example, the service provider 142 may request to access the user information for the wireless device 133 when the wireless device 133 roams on the network comprising MSC 126. When the service provider, network, or requesting network element of the roaming network is authorized, the user information (or parts thereof) may be communicated from the HLR 120 of the home network to the VLR 110 or other storage location of the roaming network. The user information may be transferred also or alternatively to the requesting service provider and/or network element.

Figure 3:
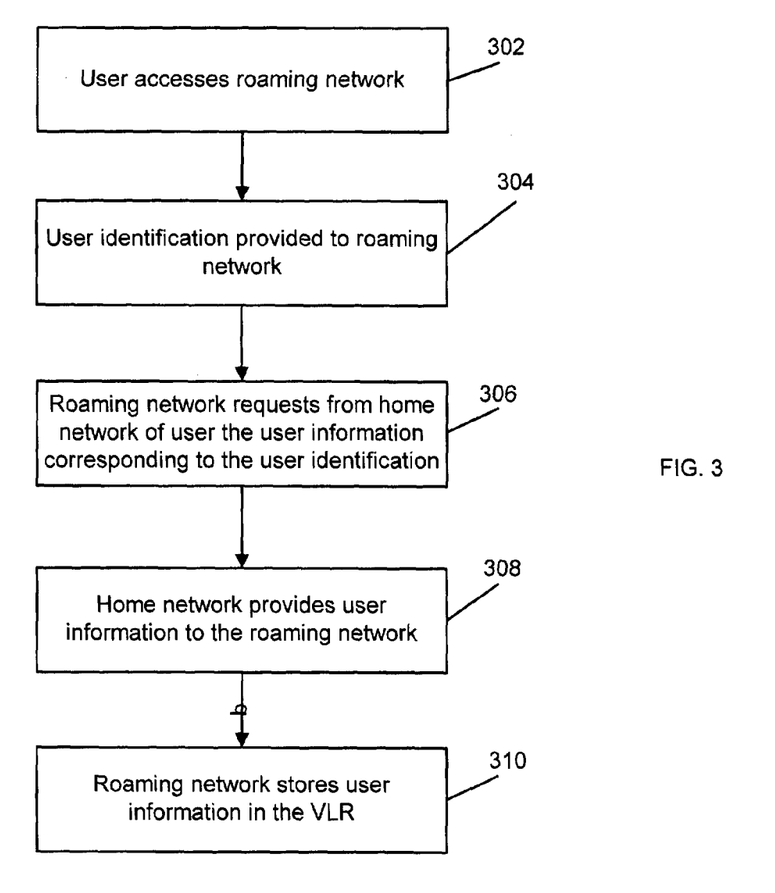
FIG. 3 is a flowchart of an embodiment of a method to provide user information for a roaming user.

FIG. 3 is a flowchart of an embodiment of a method to provide user information for a roaming user. At 302 a user accesses a roaming network using a terminal device. At 304 the user's identification is provided to the roaming network. For example, the terminal device may provide identification information in the form of a numeric or alphanumeric sequence. The code may identify the user of the terminal device, or may identify the terminal device and the user thereof by association. Examples of such codes are the Mobile Identification Number (MIN), the Mobile Station Identifier (MSID), Mobile Directory Number (MSN), and International Mobile Station Identifier (IMSI). At 306 the roaming network (e.g. a network element of the roaming network) and/or service provider requests from the home network of the user the user information corresponding to the user identification. Typically this will involve providing the identification to the home network, along with the request for at least part of the user information. In one embodiment, access credentials (e.g. identification and password) for the user information are provided along with the request. In another embodiment, the access credentials may be provided separately from the request. At 308 the home network provides the requested user information. The roaming network stores the user information at 310. For example, the roaming network may store the user information in the in the roaming network's VLR.

In one embodiment, roaming networks and/or service providers may purchase subscriptions from the operator of the home network in order to receive authorization to access the user information of users and/or terminals for which the network is the home network. Access may be limited to subsets of the user information. For example, some service providers may have access limited to terminal capabilities and user preferences, sufficient to determine whether the service provider can provide adequate service to the user's terminal device. Other service providers may purchase subscriptions that provide access to usage statistics, such as those services most frequently and most recently used by the user. This information may prove useful for marketing purposes. The cost of the subscription may be set according to which of the user information the service provider has access to. Of course, subscriptions are only one possible manner of compensating for access to the user information. Other manners of compensation include transaction charges (pay-per use), charging a percentage of the service price, and so on.

Network elements and service providers may interact to exchange user information in order to cooperatively provide an improved user experience when delivering services.

Figure 4:
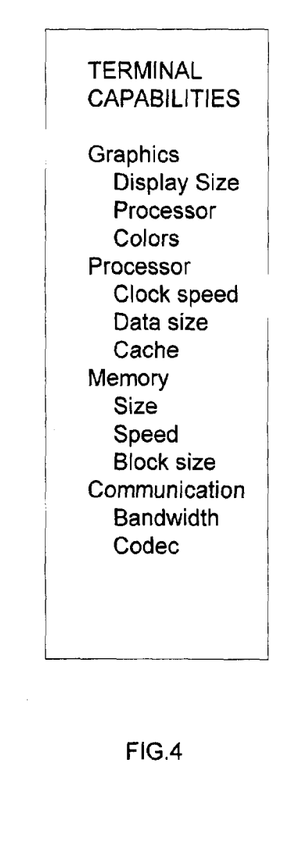
FIG. 4 is a block diagram of an embodiment of terminal capability information.

FIG. 4 is a block diagram of an embodiment of terminal capability information. The terminal capability information may be organized according to categories, such as graphics, processor, memory, and communications. Of course these are merely examples of possible categories. The categories may be defined according to subsystems of the terminal device. For example, the graphics category may comprise information about the graphics subsystem of the terminal device, information such as the display size, graphics processor, and colors employed by the graphics subsystem of the terminal device. The processor category may comprise information about the main processor employed by the terminal device, information such as the processor clock speed, data size, and cache size. The memory category may comprise information about the memory subsystem of the terminal device, information such as the memory size, speed, and bit width. The communication category may comprise information about the communication capabilities of the terminal device, information such as the communication bandwidth the device supports and the codec(s) the device supports.

Templates may be created comprising terminal capabilities for classes of devices (e.g. mobile phones, set-top boxes, personal computers, etc.). A template may comprise categories and capabilities appropriate for the class of device the template represents.

Figure 5:
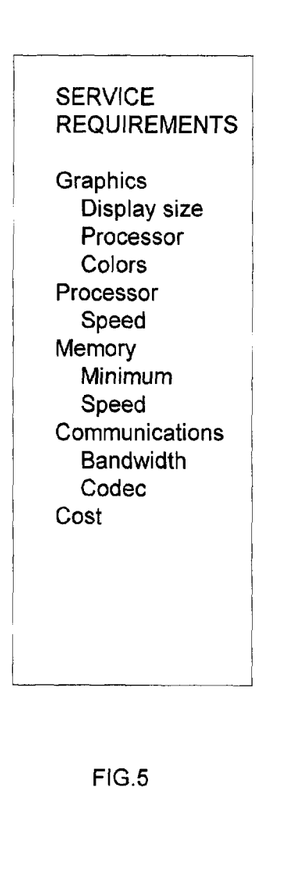
FIG. 5 is a block diagram of an embodiment of service requirement information.

FIG. 5 is a block diagram of an embodiment of service requirement information. Service providers may provide to the network requirements for the services they provide, such as graphics, processor, memory, communications, cost, and so on. The service requirement information may be organized according to categories, such as graphics, processor, memory, and communications. Of course these are merely examples of possible categories. The categories may be defined to correspond with the categories of the terminal capabilities. For example, the graphics category may comprise information about the graphics requirements to properly render the service information, information such as the display size, graphics processor, and colors that a terminal should employ to properly render the service information to the user. The processor category may comprise information about the processing capabilities that need be employed by the terminal device to properly receive and render the service (e.g. processor speed). The memory category may comprise information about the memory requirements to properly receive and render the service on a terminal device (e.g. minimum available memory, memory speed). The communication category may comprise information about the communication requirements to properly receive and render the service on a terminal device (e.g. bandwidth, codec).

Upon receiving a service request from a terminal device, the network may attempt to match corresponding categories of the terminal capabilities and service requirements to identify services that are compatible with the terminal.

Information of the cost category of the service requirements may be compared with the payment parameters of the user information to identify services that are within the user's payment parameters.

Information of the user preference category of the service requirements may be compared with the user preferences (media delivery preferences) of the user information to identify services that can be delivered according to the user's preferences.

Figure 6:
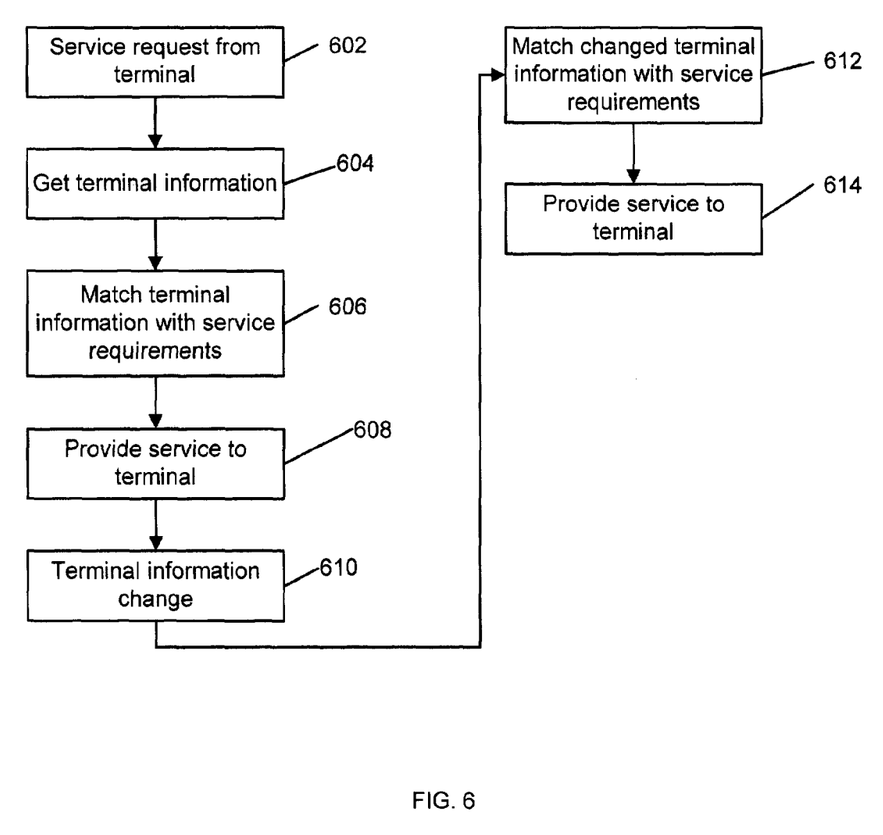
FIG. 6 is a flowchart of an embodiment of a method of handling changes in a user's terminal capabilities.

FIG. 6 is a flowchart of an embodiment of a method of handling changes in a user's terminal capabilities. The method may be employed, for example, when a user switches from using one terminal device to using another, or when the capabilities of the user's terminal change due to changing communication conditions (e.g. a user of a broadband terminal roams to an area where broadband communication is not possible via the terminal). At 602 a service request from the terminal is received. For example, the terminal may communicate a request to transact multimedia messaging, receive stock quotes, receive news feeds, and so on. At 604 the terminal capabilities for the terminal device is retrieved. The terminal capabilities may be retrieved from the user information for the user of the terminal device, e.g. from an HLR, VLR, or other storage location, or received from the terminal device itself. At 606 the terminal capabilities are matched with the service requirements of different service providers to identify those providers capable of providing the service to the terminal device. For example, while there may be several service providers capable of providing multimedia messaging to personal computers that communicate via the network, only one of the several may be capable of providing multimedia messaging to wireless telephones. Once a suitable service provider is located, the service is provided to the terminal at 608. At 610 the terminal capabilities for the user change. This could occur, as previously noted, under various circumstances. Such circumstances include a change in the terminal employed by the user, and/or changes in the communication environment of the user's terminal. At 612 the changed terminal capabilities are again matched with service requirements of the various providers, to locate a suitable provider. The service is then provided to the terminal by the suitable provider at 614.

Figure 7:
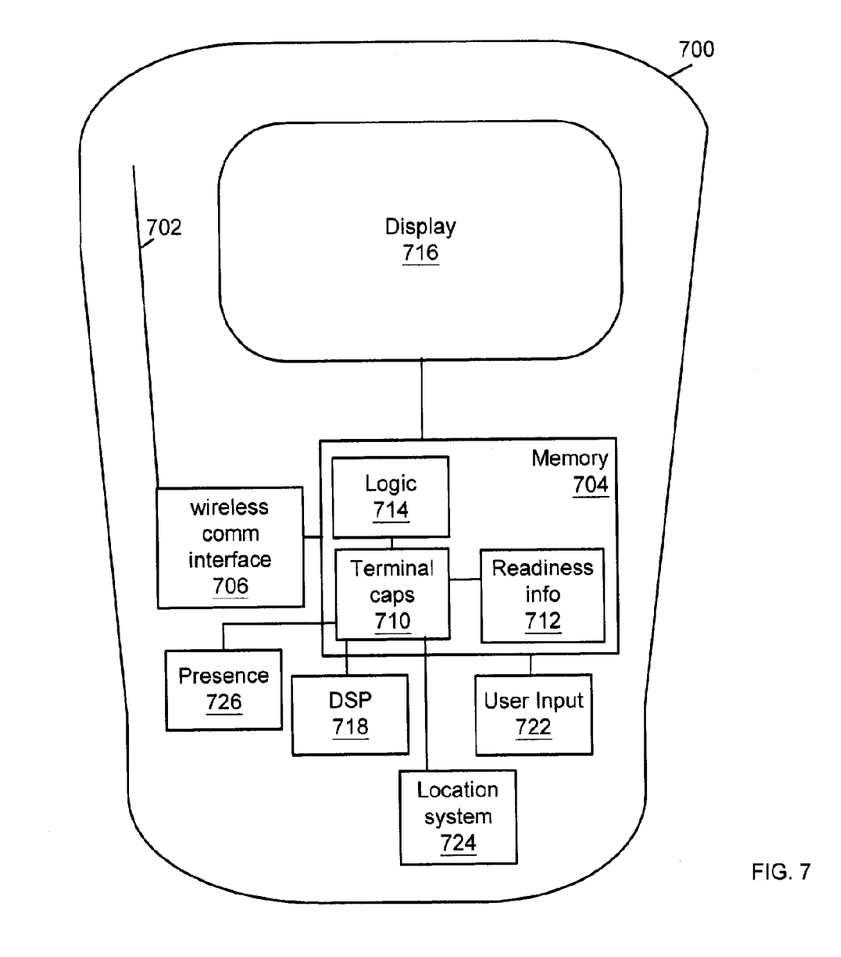
FIG. 7 is a block diagram of an embodiment of a wireless telephone.

FIG. 7 is a block diagram of an embodiment 700 of a wireless telephone. A wireless communication interface 706 is coupled to a memory 704 and a digital signal processor (DSP) 718. The wireless communication interface 706 converts signals of the DSP 718 and/or the memory 704 into wireless signals that may be transmitted via the antennae 702. Numerous other well-known elements of the telephone embodiment 700 have been omitted for clarity.

The memory 704 comprises terminal capabilities 710 and readiness information 712 for the telephone 700. The memory 704 further comprises logic 714 to update the readiness information 712 (and possibly also to update the terminal capabilities 710) and to communicate the readiness information 712 and terminal capabilities 710 to a network. Storing and updating the readiness information is referred to herein as 'maintaining' the readiness information. In one embodiment, changes to the readiness information 712 and possibly also the terminal capabilities 710 are automatically (without involving actions by a user of the wireless phone) communicated to the network, wherein the terminal capabilities and readiness information of the user information is updated accordingly. Logic 714 may comprise any set of instruction signals and/or data that may be applied to/processed by the DSP 718 or other processor of the telephone 700, or in general applied to control the operation of the phone. Logic 714 may be embodied in software, hardware, firmware, and/or combinations thereof.

The telephone 700 may comprise a location system 724 to identify the device's location to the network. The location system 724 may comprise a geographic location system, such as a Global Positioning System (GPS), or a system to determine the telephone's location using cell-site triangulation. The location system 724 may also provide a logical location of the user, e.g. "In a meeting", "In transit", "At the Office", and so on. The location system 724 may access information of a user profile, calendar, schedule, task list, and so on stored by the telephone in order to ascertain the telephone's logical position. The logic 714 may further operate to communicate location information via the wireless interface 706.

The telephone 700 may comprise a presence system 726 to identify whether the user is present at or near the telephone. The presence system 726 may comprise motion detection, vibration detection, keyboard and/or voice activity detection, and/or other technology to detect the user's presence. The logic 714 may further operate to communicate presence information via the wireless interface 706.

A display 716 may be employed to display information to a user of the phone 700. An input device 722 such as a keypad, buttons, touch pad, or voice recognition interface allows the user to input and/or select information of the phone 700. In one embodiment, the input device 722 may be integral with the display 716 (e.g. touch or pressure-sensitive screen). Of course, the phone 700 may also comprise other input/output technologies, such as a microphone and speakers.

Figure 8:
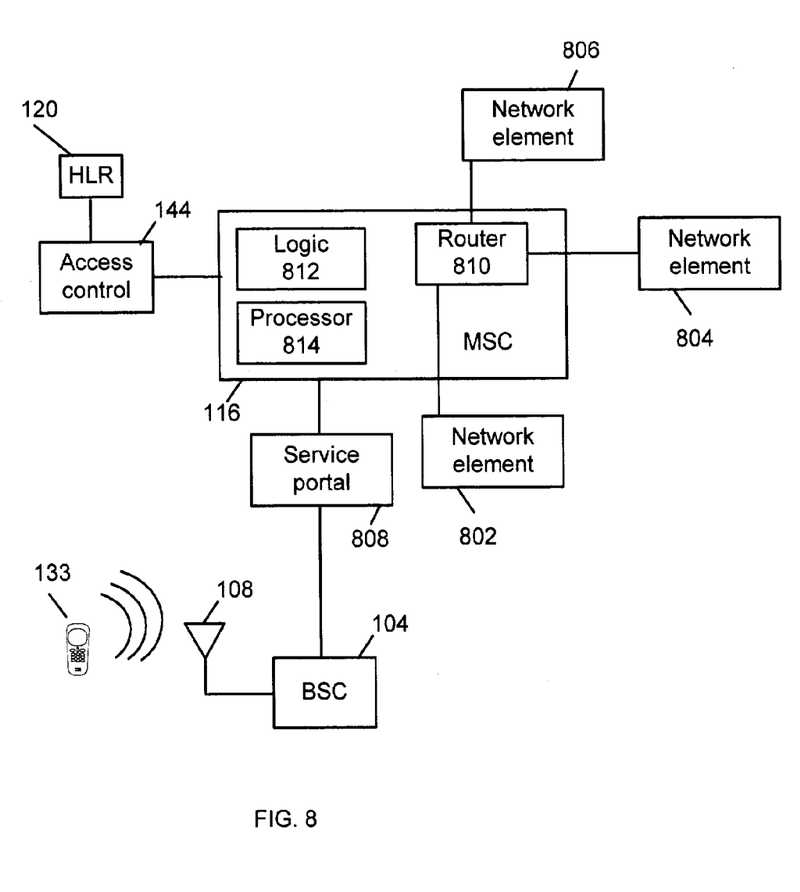
FIG. 8 is a block diagram of a network embodiment.

FIG. 8 is a block diagram of a network embodiment. The network comprises network elements 802, 804, 806 coupled to the MSC 116. The network further comprises a service portal network element 808 coupled to the MSC 116. In one embodiment the MSC 116 may allocate and assign resources of the network elements 802, 804, 806 to create "subnetworks", each to manage a type of network traffic. For example, one subnetwork (a collection of computational, operational, and storage resources allocated from among the network elements 802, 804, 806) may be assigned to handle terminal management. Another subnetwork may be assigned to handle service management, and still another to handle network management. In general, responsibility for managing and applying the user information may be divided among subnetworks according to the application to which the user information is applied. The user information of the HLR 120 may be "multiported" to allow simultaneous (or a close approximation thereof) access by the various subnetworks.

The terminal management subnetwork may interact with terminal devices to collect and store terminal capabilities. The terminal management subnetwork may be employed by other network elements to access the terminal capabilities of the user information.

When a user requests a service, the service subnetwork may employ the user information for the user to identify suitable service providers.

Network elements may employ the network management subnetwork to determine network management requirements for services and terminal devices. The network management subnetwork may access the user information to provide the network element with relevant network management information (such as how much bandwidth to allocate and the quality of service to apply to provide a particular service to a particular terminal device). The network management subnetwork may update the user information with relevant network management information received from terminal devices, service providers, and/or various network elements.

In general, at least one network element (such as the HLR 120) may be employed to store user information comprising terminal device capabilities and readiness information; another network element (such as network element 802) may access the user information and adjust media delivery parameters to the terminal device accordingly.

In one embodiment, the MSC 116 is employed to route communications to the appropriate subnetwork. Routing may be performed based upon, for example, packet headers that identify a particular communication as terminal management, service management, network management, and so on.

The resources of each subnetwork may be assigned statically, or dynamically by the MSC 116 according to, among other considerations, the amount of traffic of a particular type. Subnetwork resources include operating, memory, and processing capabilities.

The service portal 808 may be employed to locate services that are suitable to a terminal that requests the services. For example, a terminal device 133 may request streaming video service. The terminal device 133 may communicate the request to the MSC 116 via the BSC 104. The service portal 808 may communicate the request, along with terminal capabilities obtained from the terminal device 133 or from the user information, to the service providers 160, 142 (see FIG. 1). The service providers 160, 142 may in turn provide bids to the service portals. In one embodiment, the service portal 808 is a stand-alone network element. In another embodiment, the service portal 808 is comprised by the MSC 116, e.g. the service portal 808 is a functional subdivision of the MSC 116.

In one embodiment, one or more terminals and/or users may be treated collectively as a "logical user." This may be advantageous, for example, where service information is multicast to multiple terminals/users. The user information for each user of the logical user may be accessed and processed to determine user information for the logical user (for example, using statistics, averaging, selecting the lowest or highest value, etc.) The user information for the logical user may be applied to determine media delivery parameters for the user and/or terminals of the logical user, such as a bandwidth, quality of service, frame rate, and so on.

The user preferences, payment parameters, terminal capabilities, and other user information for a user may be dynamically updated by the service portal 808 according to the user's location, the terminal device they are employing, and so on. The service portal 808 may communicate user information, such as media delivery preferences, payment parameters, usage information, terminal capabilities, and readiness information, to available service providers. Those service providers with service requirements compatible with the user information may return bids. The service portal 808 may select from among the service providers that return bids. A selected service provider may interact with other network elements (such as the service management subnetwork) to determine an appropriate service contract for the user.

A processor 814 and logic 812 of the MSC 116 may operate cooperatively to form a classifier of the communications received from the terminal device(s) 133 and the other network elements. In other embodiments, the classifier may be a separate (stand-alone) device that interfaces with the MSC 116 to monitor and classify communications.

The communication may be classified as a type of user information. More generally, the communication may be classified according to one or more applications to which it applies, e.g. terminal management, service management, or network management. In packet-switched networks, one manner of classifying the communications is to examine the communication packet headers. A router 810 may be employed to route the communications to one or more of a plurality of subnetworks comprising resources of the network elements 802, 804, 806.

The logic 812 and processor 814 may further operate on the communications to determine network usage statistics for terminal devices and/or users thereof, including a service usage history, a most recently used service, and a most frequently used service. This information may be routed to the appropriate subnetwork for further processing.

Figure 9:
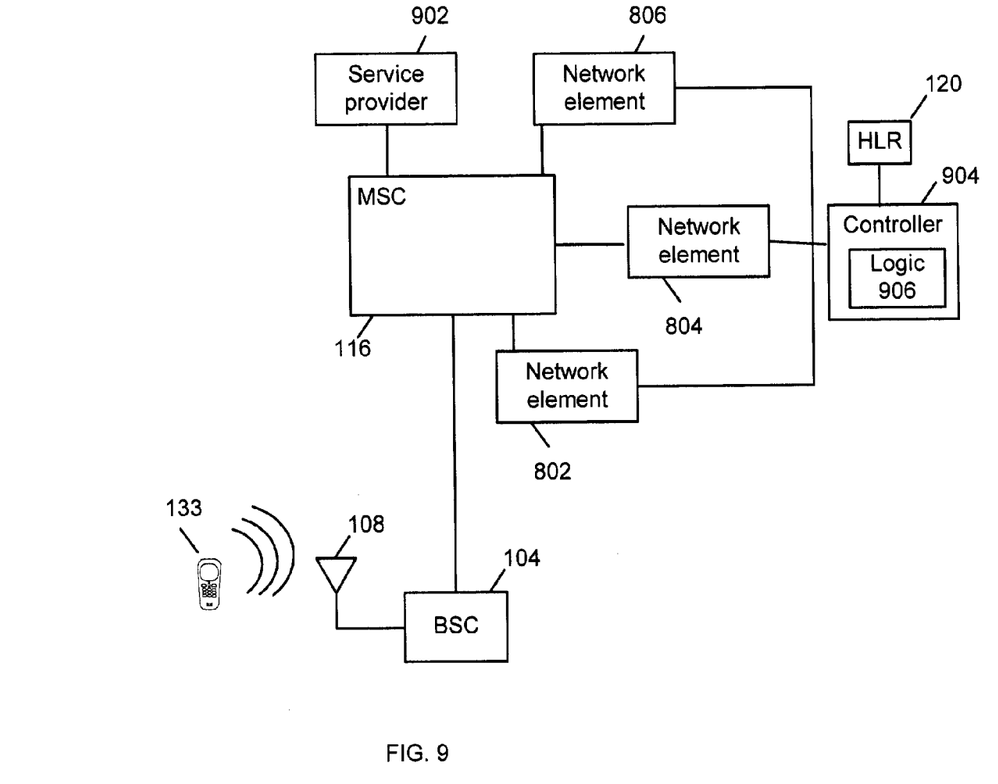
FIG. 9 is a block diagram of a network embodiment.

FIG. 9 is a block diagram of a network embodiment. A controller 904 network element is coupled to the network elements 802, 804, 806, among which responsibility for managing and applying the user information may be divided. The controller 904 may provide various functions, including access control to the user information. The controller 904 may collect user information from the network elements 802, 804, 806 and cause the user information to be stored, for example in the HLR 120. The controller 904 may read user information from the HLR 120 and provide the user information to other network elements and/or service providers 902. The controller 904 may also compare the service requirements of one or more service providers with user information to ascertain which service providers are suitable to meet a service request. The controller 904 may identify one or more suitable service providers to a terminal device that provided the service request. The terminal device, in turn, may provide a selection of the service provider to employ to deliver the service. Alternatively, the controller 904 may select a service provider on behalf of one or more terminal devices and/or users.

In one embodiment, the controller 904 may comprise logic 906 to allocate and assign resources of the network elements 802, 804, 806 to create "subnetworks", each to manage a type of network traffic, similar to the function of the MSC in FIG. 8. For example, one subnetwork may handle terminal management. Another subnetwork may handle service management, and still another may handle network management. The logic 906 may be applied to provide access control to the user information.

In one embodiment, the MSC 116 is employed to route communications to the appropriate subnetwork. Routing may be performed based upon, for example, packet headers that identify a particular communication as terminal management, service management, network management, and so on.

The resources of each subnetwork may be assigned statically, or dynamically by the controller 904. One factor in determining the amount of resources to assign to a particular subnetwork is the amount of communication traffic the subnetwork will manage.

Figure 10:
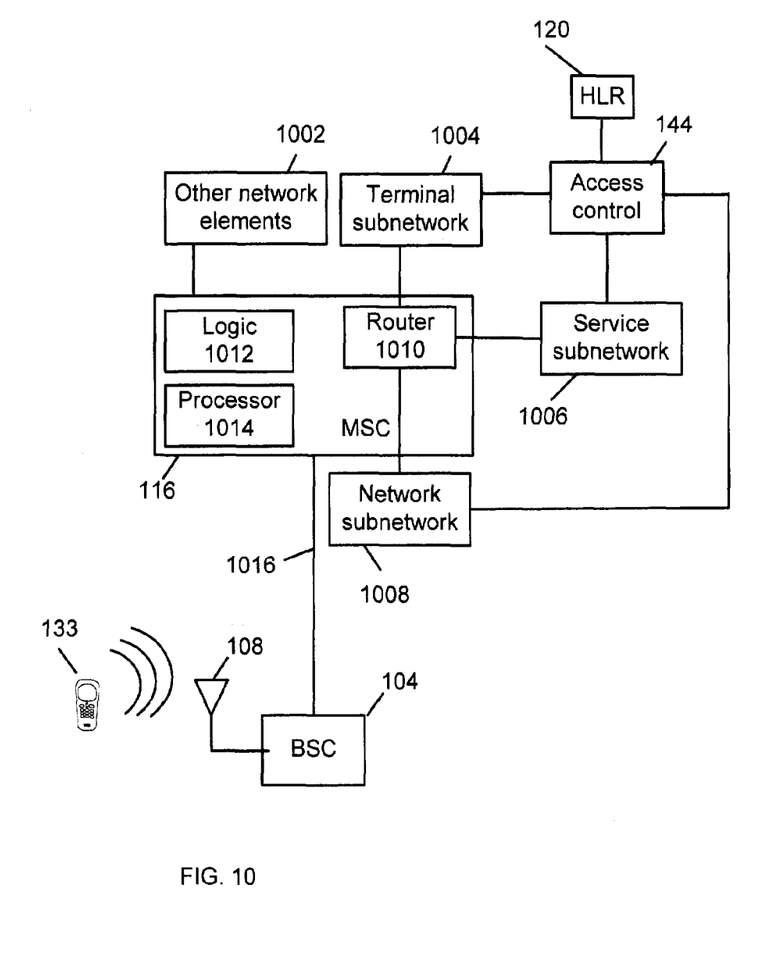
FIG. 10 is a block diagram of a network embodiment.

FIG. 10 is a block diagram of a network embodiment. The MSC 116 comprises at least one input 1016 to receive communications from one or more terminal devices 133. The MSC 116 may also receive communications from one or more other network elements 1002, via input 1016 and/or other inputs. A processor 1014 and logic 1012 may operate cooperatively to form a classifier of the communications received from the terminal device(s) 133 and the other network elements 1002. In other embodiments, the classifier may be a separate unit that interfaces with the MSC 116 to monitor and classify communications.

The communication may be classified as a type of user information, e.g. terminal capabilities, service information, and/or network information. More generally, the communication may be classified according to one or more applications to which it applies, e.g. terminal management, service management, network management, or some other application. In packet-switched networks, one manner of classifying the communications may be to examine the communication packet headers. A router 1010 may be employed to route the communications to one or more of a plurality of subnetworks 1004, 1006, 1008, according to the classification.

The logic 1012 and processor 1014 may further operate on the communications to determine network usage statistics for terminal devices and/or users thereof, including a service usage history, a most recently used service, and a most frequently used service. This information may be routed to the appropriate subnetwork for further processing.

The resources of each subnetwork 1004, 1006, 1008 may be assigned statically, or dynamically by the MSC 116. Subnetwork resources include memory and processing capabilities. Each subnetwork 1004, 1006, 1008 may be responsible for causing a type of user information to be read from and stored in a storage location of the network, such as in a home location registry 120 or home subscriber system.

Figure 11:
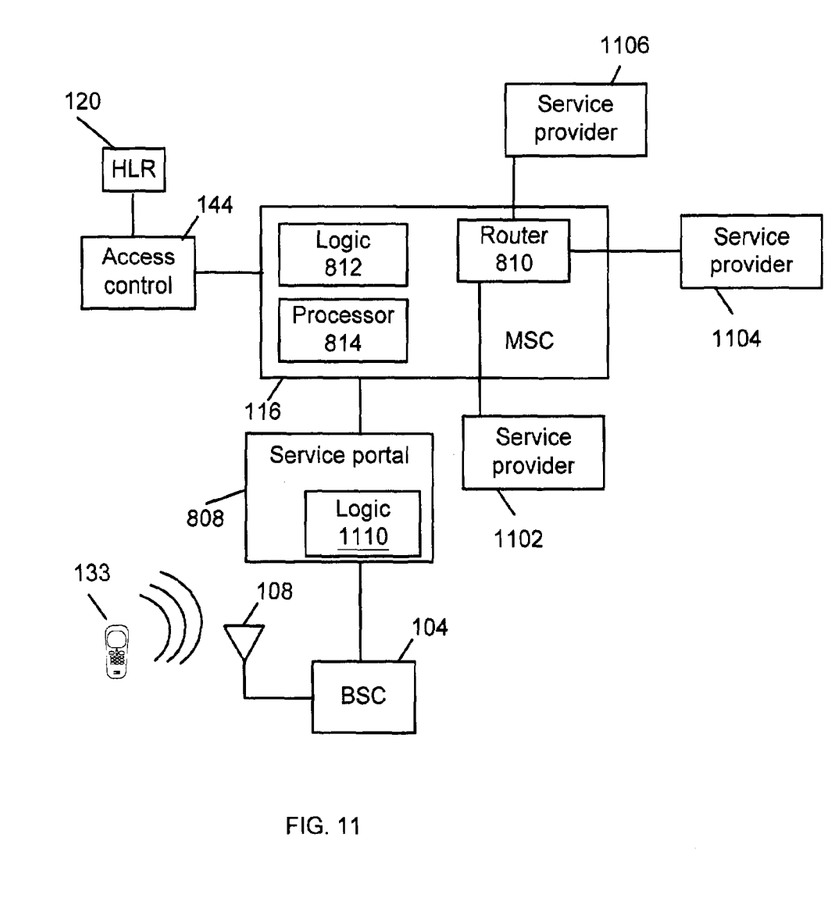
FIG. 11 is a block diagram of a network embodiment.

FIG. 11 is a block diagram of a network embodiment. A plurality of service providers 1102, 1104, 1106 are coupled to the MSC 116. A terminal device 133 accesses the network via a service portal 808. The service portal receives service requests from the terminal device 133. A plurality of terminal devices may access the network via the portal 808. The portal 808 may receive terminal capabilities and payment parameters for a terminal device 133 (either from the terminal device 133 or from a storage location such as the HLR 120). The service portal 808 may also receive user preference information for a user of the terminal device 133, again from either the device 133 or from a storage location of the network. In like fashion, the service portal 808 may receive presence information, location information, and readiness information for the device 133. The portal 808 comprises logic 1110 to provide the terminal capabilities and payment parameters to one or more service providers 1102, 1104, 1106 associated with the network, and to receive and evaluate bids returned by service providers that are capable of providing a service compatible with the terminal capabilities and payment parameters. Additional information may be provided to the service providers 1102, 1104, 1106, such as the user preferences. In this manner the service providers 1102, 1104, 1106 may provide more accurate and/or meaningful bids.

In one embodiment, less user information is provided to the service providers 1102, 1104, 1106. The logic 1110 of the portal 808 operates to select which service providers to solicit bids from, based on information about the service requirements of the service providers. In other words, bids are solicited only from service providers with service requirements compatible with the terminal capabilities, payment parameters, user preferences, and so on of the terminal device 133.

The logic 1110 may operate to evaluate the bids and to select a service provider to provide the service to the terminal device 133. The logic 1110 may further operate to form a service contract with the selected service provider on behalf of the user of the terminal device 133, and to connect the selected service provider with the terminal device 133 such that the service can be delivered. The logic 1110 may also operate to update, in the network storage location (e.g. HLR, HSS), any user information for the user of the terminal device 133.

Figure 12:
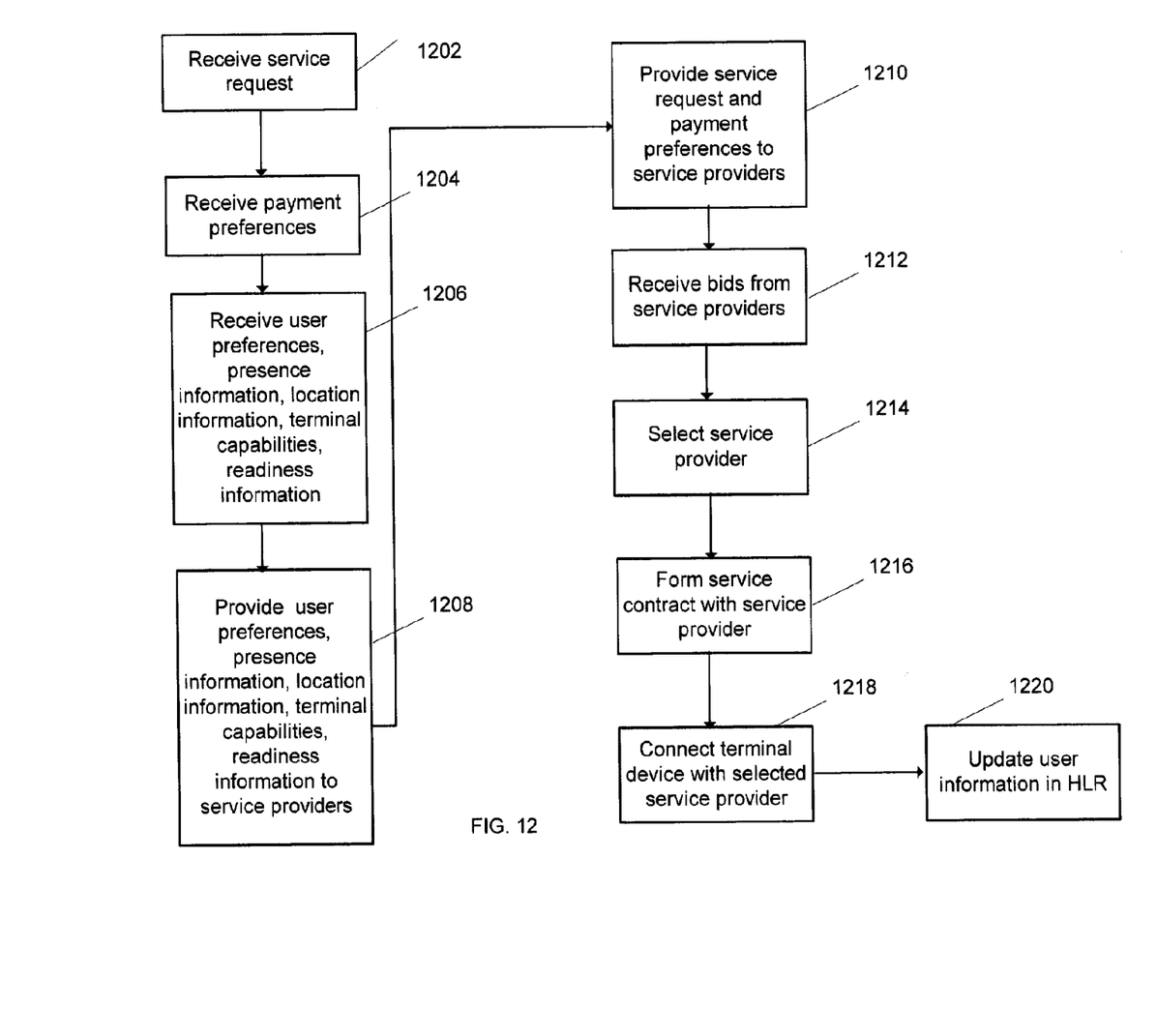
FIG. 12 is a flow chart of an embodiment of a method to provide services to terminal devices.

FIG. 12 is a flow chart of an embodiment of a method to provide services to terminal devices. At 1202, 1204, and 1206 a service request, payment parameters, and other user information respectively are received. The other user information may comprise at least one of user preferences, presence information, location information, terminal capabilities, and readiness information. At 1208 and 1210 at least some of the user information, such as the terminal capabilities and payment parameters, is provided to a plurality of service providers. As previously noted, the amount of information provided to the service providers may vary in different embodiments. At 1212 bids are received from the service providers; the bids are evaluated, and a service provider is selected to provide the service at 1214. A service contract on behalf of the user of the terminal device is formed with the service provider at 1216.

At 1218 the terminal device is connected with the selected service provider, such that the service may be delivered to the terminal device. User information stored by the network (e.g. in the HLR or HSS or other storage location) may be updated at 1220 with information obtained from the terminal device, service provider, or other source. In this manner the user information of the network is maintained up to date.

While certain features of the invention have been illustrated as described herein, many modifications, substitutions, changes and equivalents will now occur to those skilled in the art. It is, therefor, to be understood that the appended claims are intended to cover all such embodiments and changes as fall within the true spirit of the invention. In the claims, references to "a" or "an" element do not limit the claims to a single one of the element, but instead indicate one or more of the element, unless otherwise indicated.

The invention claimed is:

1. A method, comprising:
receiving, by a server comprising at least one processor, a first plurality of media delivery parameters from a first terminal device across a network, wherein the first plurality of media delivery parameters comprises a readiness information and a presence information of the first terminal device, and wherein the first plurality of media delivery parameters are dynamically updated based upon a changing communication condition between the first terminal device and the network;
soliciting, by the processor, a bid from each of a plurality of media providers to provide a service to the first terminal device based upon the first plurality of media delivery parameters;
selecting, by the processor, a first media provider based on a combination of a received bid and an ability of the first media provider to deliver the service to the first terminal device according to the first plurality of media delivery parameters;
receiving, by the processor, a second plurality of media delivery parameters of a second terminal device associated with the first terminal device, the second plurality of media delivery parameters indicating that the first terminal device has been switched with the second terminal device; and
selecting a second media provider to deliver the service to the second terminal device based upon the second plurality of media delivery parameters.

2. The method of claim 1, wherein the first plurality of media delivery parameters further comprises a terminal capability of the first terminal device.

3. The method of claim 1, further comprising determining a quality of service for delivery of media to the first terminal device based on the first plurality of media delivery parameters.

4. The method of claim 1, wherein determining the quality of service includes determining a frame rate, a compression ratio, and a frame size of a media resource to be delivered to the first terminal device.

5. The method of claim 1, further comprising updating a location of the first terminal device.

6. The method of claim 1, further comprising forming a service contract with the first media provider.

7. The method of claim 1, wherein the second service provider from the plurality of service providers is selected based in part upon a second bid provided by the second service provider.

8. A server, comprising:

a processor; and a memory that stores logical instructions that, when executed by the processor, cause the processor to perform operations comprising:

receiving a first plurality of media delivery parameters from a first terminal device across a network, the first plurality of media delivery parameters comprise a readiness information and a presence information of the first terminal device that are dynamically updated based on a communication channel between the first terminal device and the network;

selecting a first service provider from among a plurality of service providers based upon a plurality of bids submitted by the plurality of service providers, the plurality of bids indicating each service provider's ability to deliver a media resource to the first terminal device according to the first plurality of media delivery parameters; and selecting a second media provider to deliver the media resource to a second terminal device in response to receiving a second plurality of media delivery parameters of the second terminal device, the second plurality of media delivery parameters indicating that the first terminal device has been switched with the second terminal device.

9. The server of claim 8, wherein the second plurality of media delivery parameters indicates that the second terminal device is connected to the network.

10. The server of claim 8, wherein the first plurality of media delivery parameters is updated via a service portal.

11. The server of claim 8, wherein the operations further comprise:

storing media delivery parameters for each of a plurality of associated terminal devices; and soliciting the plurality of bids from the plurality of service providers depending upon a most recent updated media delivery parameter.

12. A system, comprising:

a server comprising a processor; and a memory that stores logical instructions that, when executed by the processor, cause the processor to perform operations comprising:

updating a stored readiness information and a stored presence information for a first terminal device associated with a user account;

selecting a first service provider from a plurality of service providers based upon a plurality of bids submitted by the plurality of service providers, wherein each of the plurality of service providers are capable of delivering a media resource to the first terminal device based on the stored readiness information and the stored presence information;

forming a service contract with the first service provider;

applying the readiness information, the presence information, and a plurality of terminal capabilities to determine an optimal quality of service for providing the media resource to the first terminal device; and selecting a second service provider to provide the media resource to a second terminal device associated with the user account in response to receiving an indication that the first terminal device has been switched with the second terminal device.

13. The system of claim 12, wherein the operations further comprise receiving updated stored readiness and presence information from the second terminal device.

14. The system of claim 13, wherein the operations further comprise dynamically selecting the second service provider from the plurality of service providers based upon the updated stored readiness and presence information.

15. The system of claim 13, wherein the updated stored readiness and presence information indicate that the second terminal device associated with the user account is activated.

16. The system of claim 12, wherein the second service provider is selected based in part on a list of terminal capabilities of a plurality of terminal devices associated with the user account and service requirements for each of the plurality of terminal devices.

17. The system of claim 12, wherein the operations further comprise discontinuing the service contract with the first service provider.

* * * * *